(12) United States Patent
Sullivan et al.

(10) Patent No.: US 8,573,541 B2
(45) Date of Patent: Nov. 5, 2013

(54) WAVY AIRFOIL

(76) Inventors: John Sullivan, Marriottsville, MD (US); Collin Robert Sullivan, Marriottsville, MD (US)

(*) Notice: Subject to any disclaimer, the term of this patent is extended or adjusted under 35 U.S.C. 154(b) by 537 days.

(21) Appl. No.: 12/807,727

(22) Filed: Sep. 13, 2010

(65) Prior Publication Data

US 2012/0061522 A1    Mar. 15, 2012

(51) Int. Cl.
*B64C 21/10*    (2006.01)

(52) U.S. Cl.
USPC .......................................... 244/200; 244/198

(58) Field of Classification Search
USPC ................. 244/200, 198, 200.1, 130
See application file for complete search history.

(56) References Cited

U.S. PATENT DOCUMENTS

| | | | | |
|---|---|---|---|---|
| 2,272,358 | A * | 2/1942 | Steinhaus | 416/20 R |
| 4,706,910 | A * | 11/1987 | Walsh et al. | 244/130 |
| 4,753,401 | A * | 6/1988 | Bechert | 244/130 |
| 4,932,612 | A * | 6/1990 | Blackwelder et al. | 244/207 |
| 5,860,626 | A * | 1/1999 | Moser | 244/200 |
| 6,345,791 | B1 * | 2/2002 | McClure | 244/200 |
| 6,729,846 | B1 * | 5/2004 | Wobben | 416/241 A |
| 7,566,203 | B2 * | 7/2009 | Moser | 416/235 |
| 8,323,775 | B2 * | 12/2012 | Van Merkstoijn | 428/167 |
| 2006/0060721 | A1 * | 3/2006 | Watts et al. | 244/200 |

* cited by examiner

*Primary Examiner* — Christopher P Ellis
(74) *Attorney, Agent, or Firm* — Lawrence S. Kramer (57) ABSTRACT

This invention uses a novel shape of airfoil to achieve an improved lift to drag ratio and to improve performance at higher angles of attack. The airfoil has a three dimensional wave pattern that modifies the shape of a traditional airfoil to coordinate the airflow through channels on both the top and bottom sides. The uniquely shaped airfoil of this invention could have many uses including a wind turbine blade. This invention not only provides for a more efficient device by improving the effective angle of attack and lift/drag ratio, but also provides for a quiet airflow thus greatly reducing nuisance noise over conventional devices.

15 Claims, 11 Drawing Sheets

WAVY AIRFOIL

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

To improve the lift over drag ratio on airfoils, many methods have been used including the attachment of vortex generators and turbulators. These devices delay separation of the boundary layer fluid flow from the surface of an airfoil and thus reduce drag. Reduced drag also provides for an increased usable angle of attack of an airfoil improving lift at slow speeds. There are also many examples of other surface modifications of airfoils including corrugations or other geometrical modifications to modify the boundary layer.

In U.S. Pat. No. 6,431,498, Watts and Fish disclose a scalloped wing leading edge to increase the lift over drag ratio. The wavelike protrusions on the leading edge are aligned such that the channeled air flow on the top side is aligned with the channeled air flow on the bottom side and these flows mix behind the trailing edge. These inventors studied the flippers of the humpback whale as an example of a natural design that provides a hydrodynamic advantage for highly efficient swimming. The whale's flippers are modified by irregular bumps or tubercules across the leading edge that improve lift and reduce drag.

In U.S. Pat. No. 4,813,633 (Werle et. al.) and U.S. Pat. No. 4,813,635 (Paterson et. al.) a wavy trailing edge is used to reduce drag. In these examples, the troughs on the opposite surfaces are aligned. In U.S. Pat. No. 4,830,315 (Presz, Jr. et. al.) a wavy or corrugated trailing edge is used to reduce drag. Likewise in U.S. Pat. No. 5,533,865 Dassen and Hagg and in U.S. Pat. No. 6,830,436, Shibata et. al. describe a serrated saw toothed trailing edge on wind turbine airfoil blades to improve performance as does Gliebe in U.S. Pat. No. 6,733,240 on a turbofan blade. In U.S. Pat. No. 5,114,099, Gao uses a number of surface modifications to reduce turbulent drag of fluids including an airfoil with a partially wavy surface pattern on the top side.

In addition to airfoils for aircraft and wind or water turbines, the technology of boundary layer control is also utilized to improve the performance of heat exchangers. One example of this is U.S. Pat. No. 3,741,285 by Kuethe who teaches the use of surface elements for vortex amplification. Surface elements for wind turbine airfoil blades such as vortex breakers on the trailing edge (US application publication number 2009/0016891) or vortex generators on the top surface (US application publication number 2010/0008787 A1) are just a couple of the many examples of this technology.

BRIEF SUMMARY OF THE INVENTION

This invention uses a novel shape of airfoil to achieve an improved lift to drag ratio and to improve performance at higher angles of attack. The airfoil has a three dimensional wave pattern such that the troughs on the top surface are 180° out of phase with the troughs on the bottom surface. In this way the accelerated air flow channel on the top side is aligned with the low pressure area between the channels on the bottom side. This alignment gives the highest pressure differential between the top and bottom of the airfoil thus improving lift and reducing noise. In another embodiment, waves on the leading and trailing edge of the airfoil are also similarly aligned.

This invention is different from the prior art because it utilizes a wave pattern throughout the entire airfoil in all three dimensions. The prior art has either used a wave pattern on a straight blade, or added a wave pattern of bumps to the leading or trailing edge of an airfoil. In addition, this alignment of the topside channel with the area between channels on the bottom is different from the closest prior art. Unlike the prior art, this invention modifies the shape of a traditional airfoil to coordinate the airflow through channels on both the top and bottom sides.

The uniquely shaped airfoil of this invention could have many uses, including but not limited to a vertical or horizontal wind turbine blade, an airplane wing, a helicopter blade, a hydro turbine blade, or a component of a heat exchanger. This invention not only provides for a more efficient device by improving the effective angle of attack and lift/drag ratio, but also provides for a quiet airflow thus greatly reducing nuisance noise over conventional devices.

BRIEF DESCRIPTION OF THE DRAWINGS

To improve the understanding of this invention, figures are provided to better describe examples of design and operation. These drawings represent examples of preferred embodiments but additional designs and operational conditions may also be included.

DETAILED DESCRIPTION OF THE INVENTION

Figure 1:
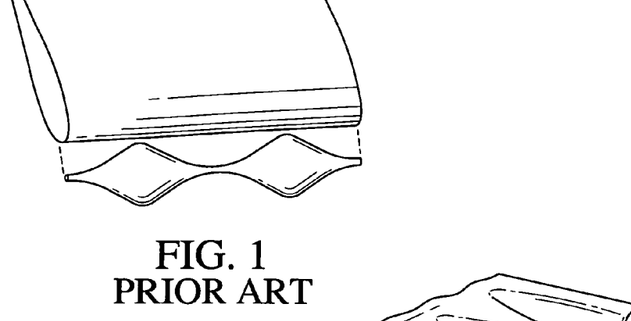
FIG. 1 is an example of prior art
Figure 2:
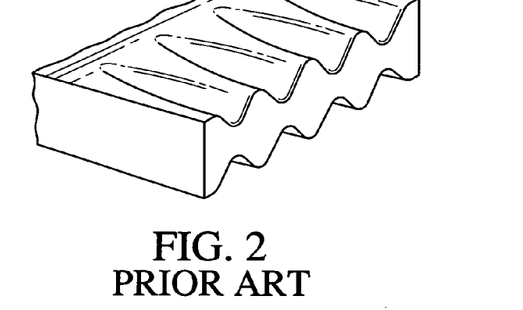
FIG. 2 is another example of prior art
Figure 3:
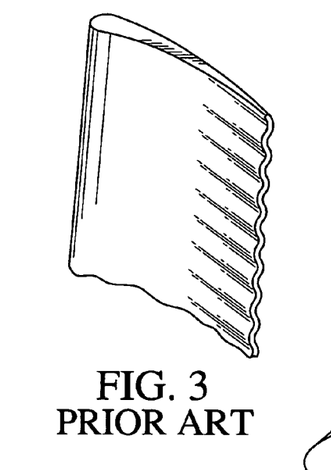
FIG. 3 is another example of prior art
Figure 4:
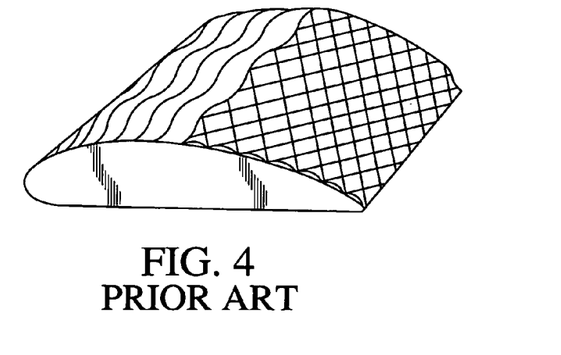
FIG. 4 is another example of prior art

Drawings from some of the closest prior art are shown to better illustrate how the current invention differs. In FIG. 1, from U.S. Pat. No. 6,431,498 an airfoil is shown to which protrusions are added to the leading edge. This scalloped leading edge has the resultant waveforms on the top and bottom surfaces aligned such that they are 180 degrees out of synchronization with each other. In FIG. 2, from U.S. Pat. No. 4,813,633, the waveforms are aligned in much the same way as in FIG. 1, although when this is applied to an airfoil (not shown) it is used on the trailing edge. FIG. 3, from U.S. Pat. No. 4,830,315 is another example of a waveform structure applied to the trailing edge of an airfoil, but this waveform has the top and bottom surfaces synchronized. Finally, FIG. 4, from U.S. Pat. No. 5,114,099 shows an airfoil with the top surface partially comprised of a wavelets.

Figure 5:
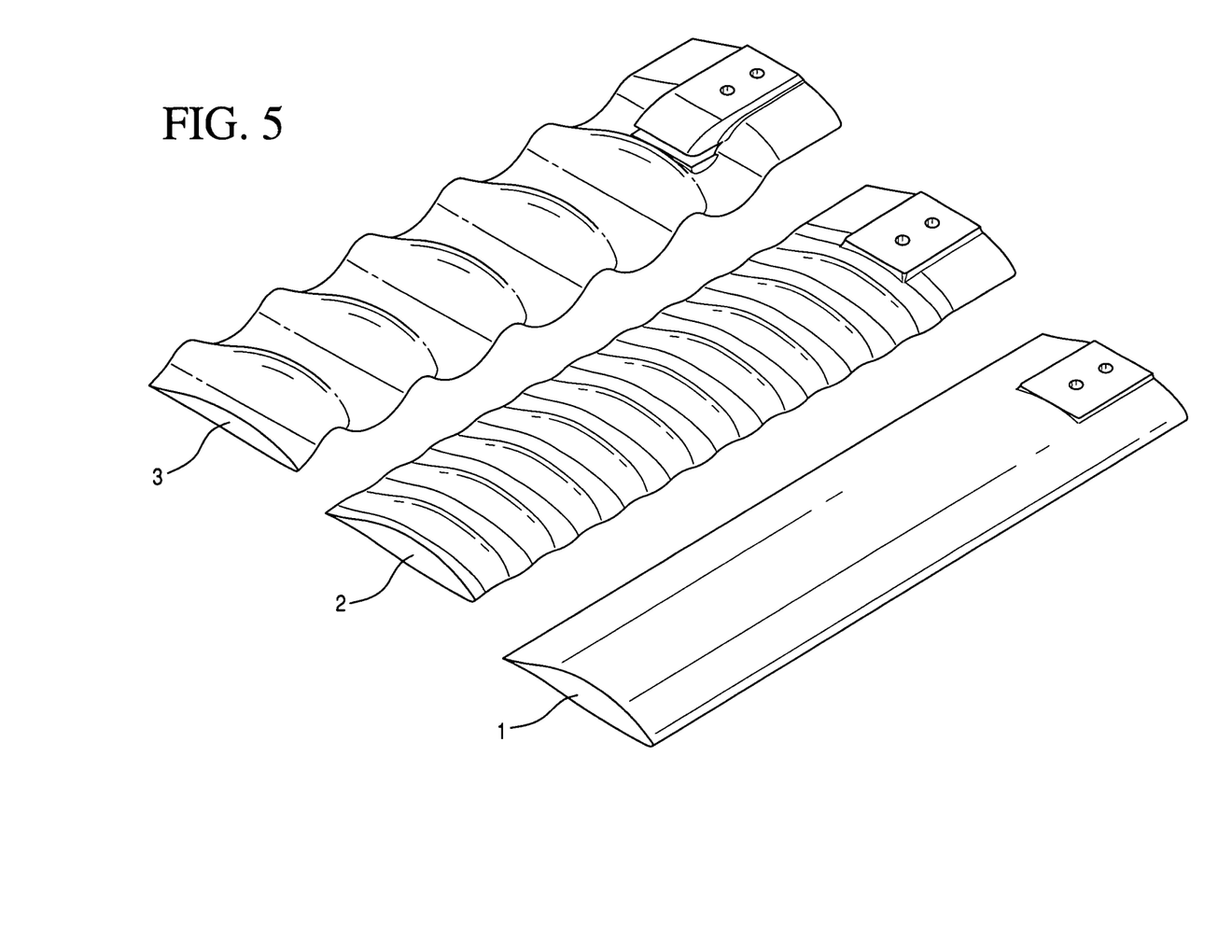
FIG. 5 shows three airfoil variants
Figure 6:
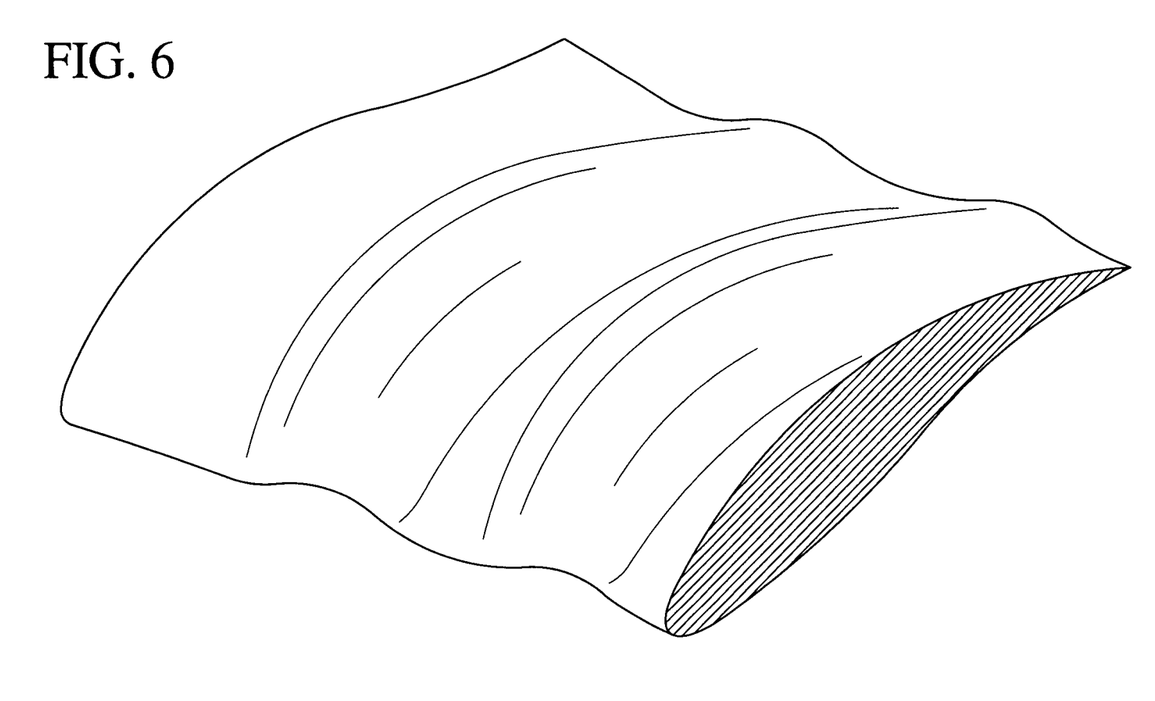
FIG. 6 shows a wavy airfoil

Three airfoils suitable for use in horizontal axis wind turbines are shown in FIG. 5. A standard airfoil blade (1) is alongside two wavy airfoil blades, one with a short wavelength (2) and one with a longer wavelength (3). The waveform is in all three dimensions and encompasses the whole airfoil from the leading edge to the trailing edge. As shown, the distance between troughs or wavelength and the peaks or amplitude of the waveform can be varied to better suit conditions. Although the figures show airfoils with a constant waveform, in one embodiment the waveform is variable along the length of an airfoil. For example, the wavelength and amplitude can be different from the fixed end to the free end of the airfoil.

Figure 7:
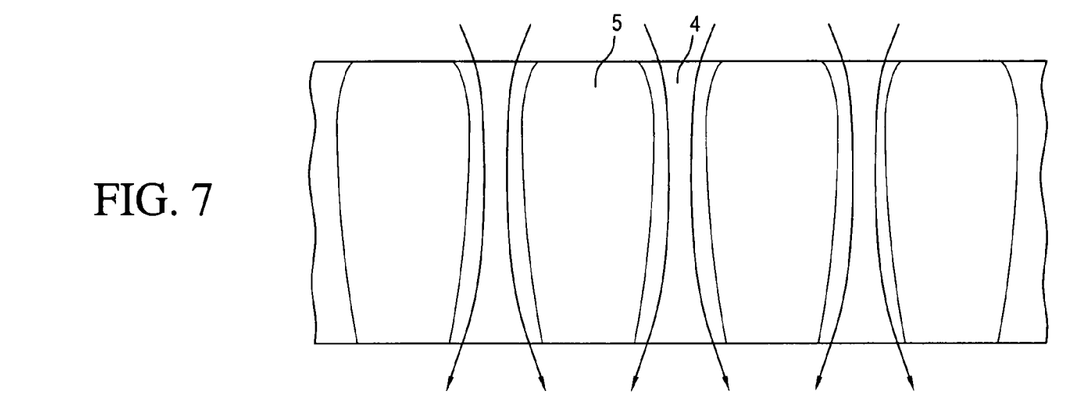
FIG. 7 shows the air flow over the top surface of a wavy airfoil
Figure 8:
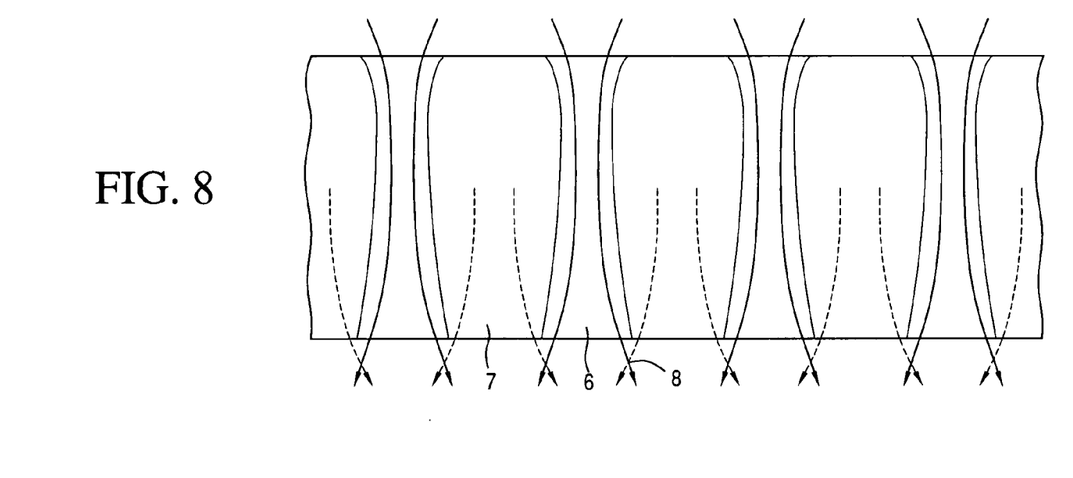
FIG. 8 shows the air flow over the bottom surface of a wavy airfoil
Figure 9:
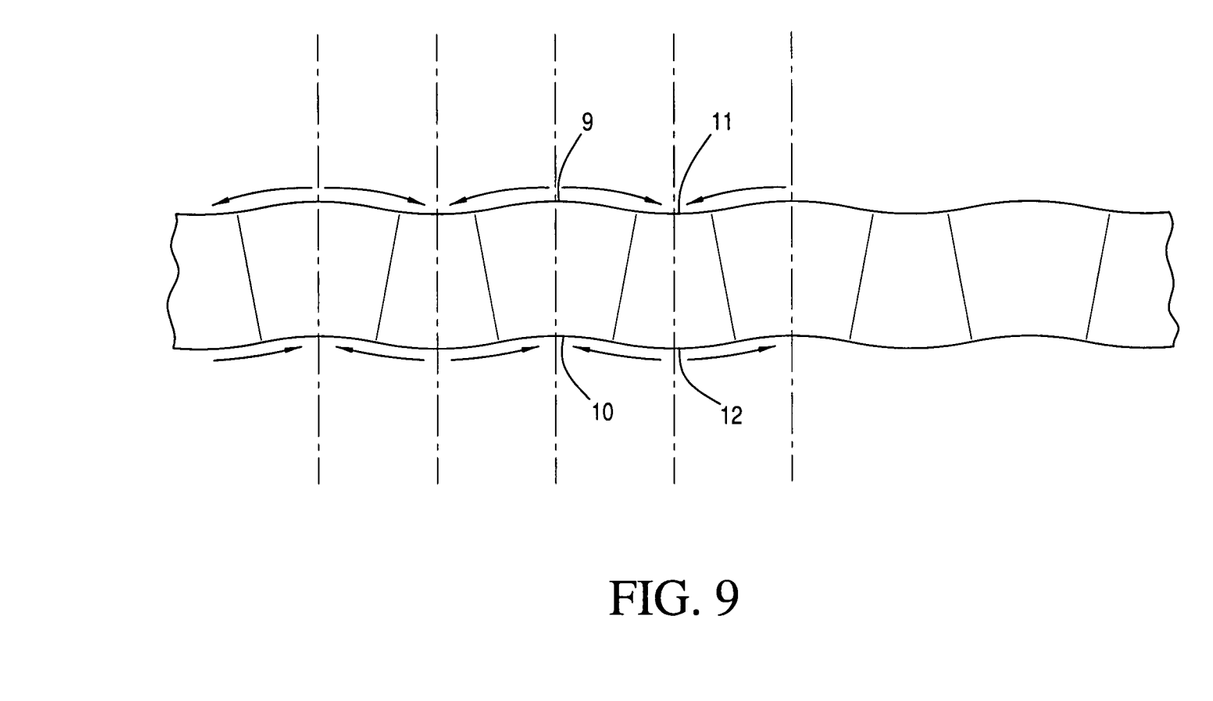
FIG. 9 shows the air flow as through a cross section of a wavy airfoil

FIG. 7 is another view of a wavy airfoil that perhaps gives a better perspective of the three dimensional nature of the waveform as applied to an airfoil shape. FIG. 7 shows the airflow over the top surface of the airfoil and FIG. 8 shows the airflow under the bottom surface of the airfoil. On the top surface, air is forced into the troughs of the waveform (4) and away from the peaks (5). Likewise on the bottom surface, the air is also forced through the troughs (6) and away from the peaks (7). Slightly behind the trailing edge of the airfoil these airflows from the top and bottom surface cross (8). This synchronization of the top and bottom surface wave forms causes the highest pressure area on the top surface (troughs) to be directly aligned with the lowest pressure area on the bottom surface (peaks) thus providing for the greatest pressure differential possible. In addition, by having the high pressure airflows from the top and bottom cross slightly behind the trailing edge, the separation of the boundary layer from the airfoil is delayed and turbulence reduced. FIG. 9 is a cross-section view of the airfoil that shows this waveform synchronization. Air is forced away from the peaks on the top surface (9) directly over where the airflow is forced together into the trough on the bottom surface (10) of the airfoil. Likewise, air is forced together into troughs on the top surface (11) directly over the peak of the bottom surface (12) where the air is forced apart. The high and low pressure differentials across the airfoil are thus maximized. In addition to the top to bottom waveform synchronization, the shape of the leading edge and the trailing edge are also wave-like and the troughs and peaks of these edges are synchronized as well.

Figure 10:
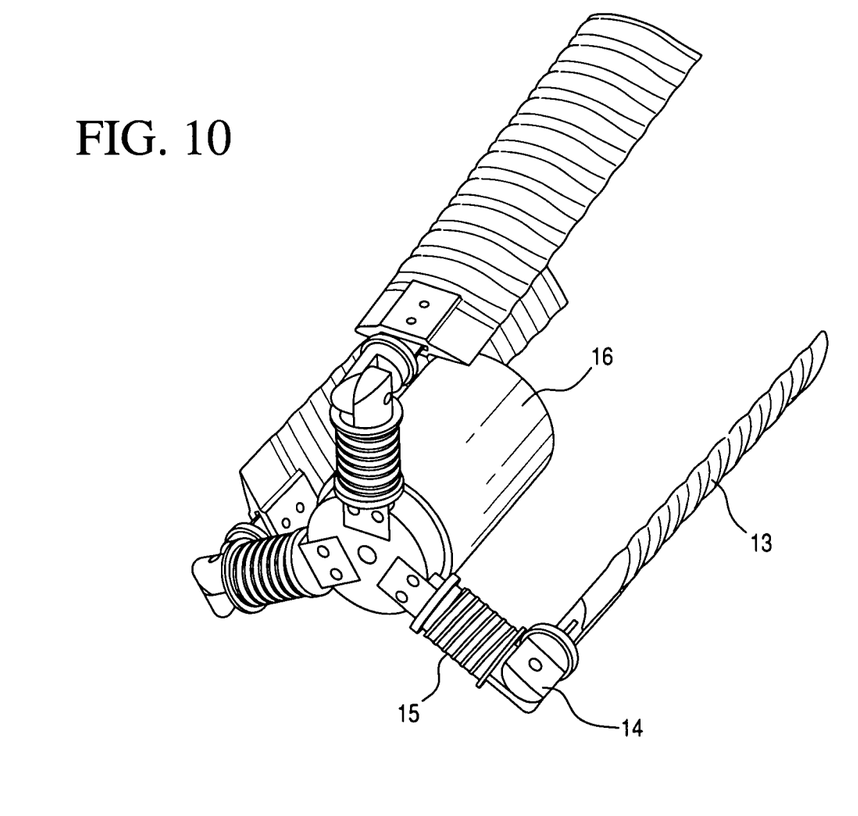
FIG. 10 shows wavy airfoils in use in a collapsible horizontal axis wind turbine
Figure 11:
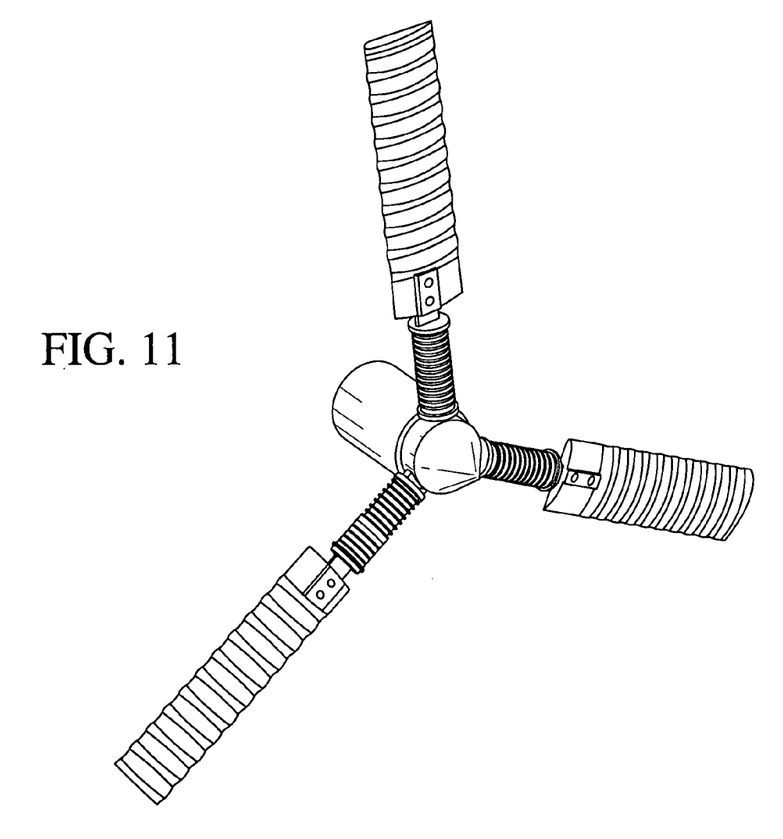
FIG. 11 shows wavy airfoils in use in a collapsible horizontal axis wind turbine

FIG. 10 is an example of one type of horizontal axis wind turbine (HAWT) utilizing wavy airfoil blades. In this embodiment the wavy airfoil blade (13) is attached via a hinge (14) to a connecting arm (15) to a central rotating member (16) that is used to power a generator. This figure shows the turbine in a closed position suitable for transport, whereas the blades would be extended by straightening the hinge joints during normal operation as shown in FIG. 11. The hinged joints contain a twist mechanism in the form of a spring loaded rotary spline ferrule beneath a moveable sleeve. In the closed position, as pictured, the sleeve is compressed allowing the joint to fold the blades inward. In the operational position, the sleeve locks over the joint, now straight, and the twist mechanism provides a means to slow down the spin during high winds by reducing the angle of the blades into the wind thus protecting the wind turbine from damage, yet maintaining operation.

Figure 12:
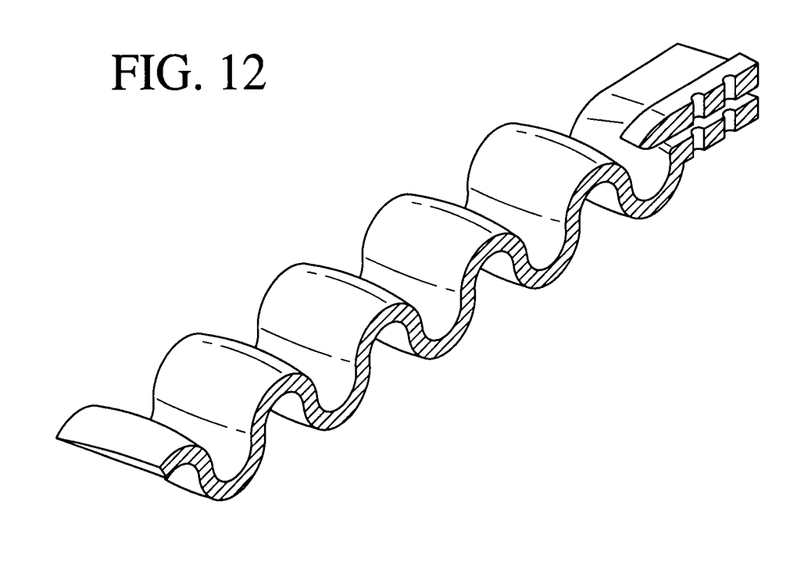
FIG. 12 shows a portion of a wavy airfoil
Figure 13:
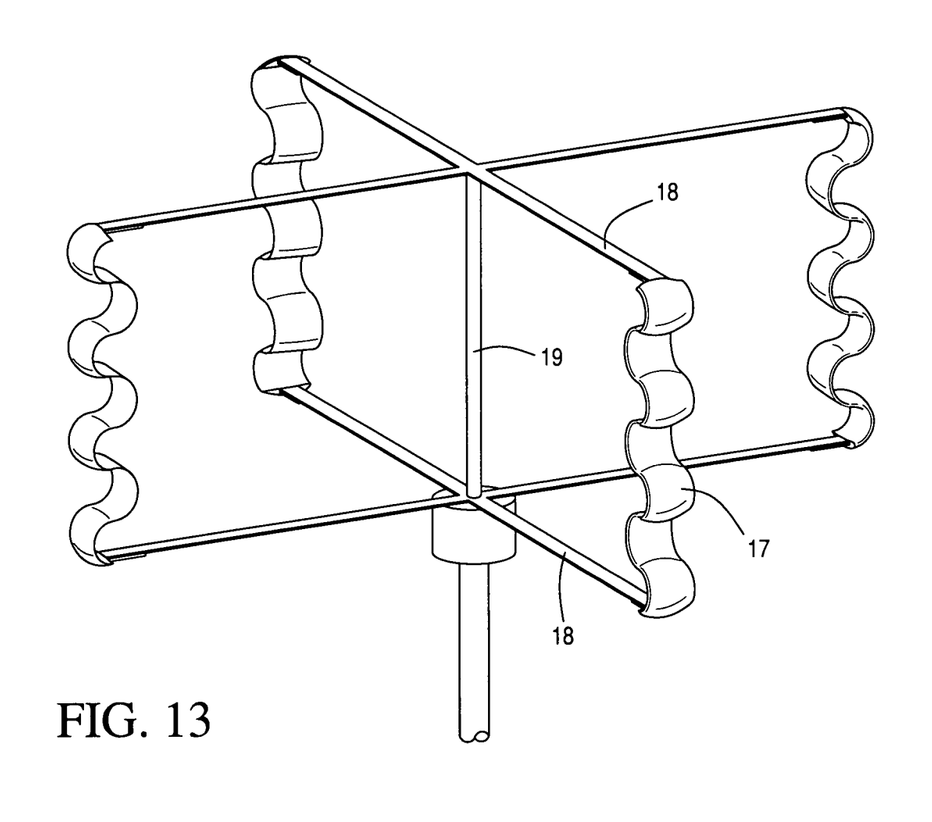
FIG. 13 shows wavy airfoils in use in a vertical axis wind turbine (VAWT)
Figure 14:
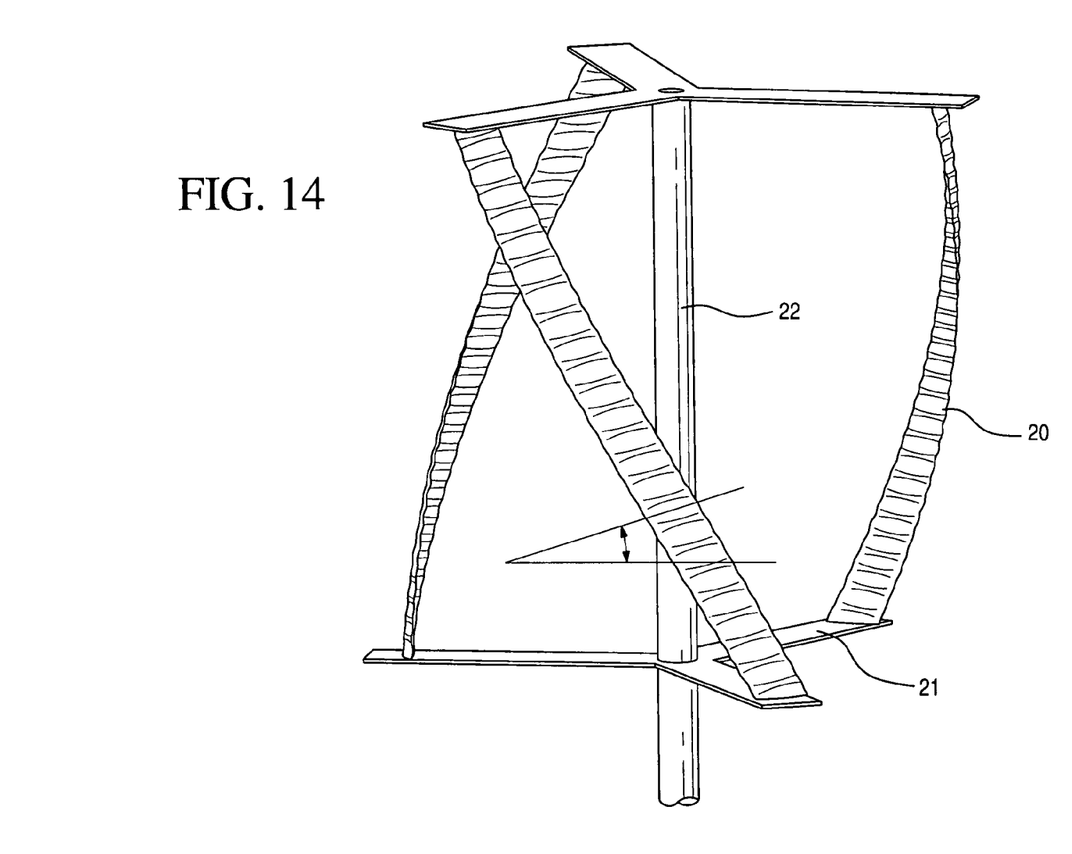
FIG. 14 shows wavy airfoils in use in another VAWT
Figure 15:
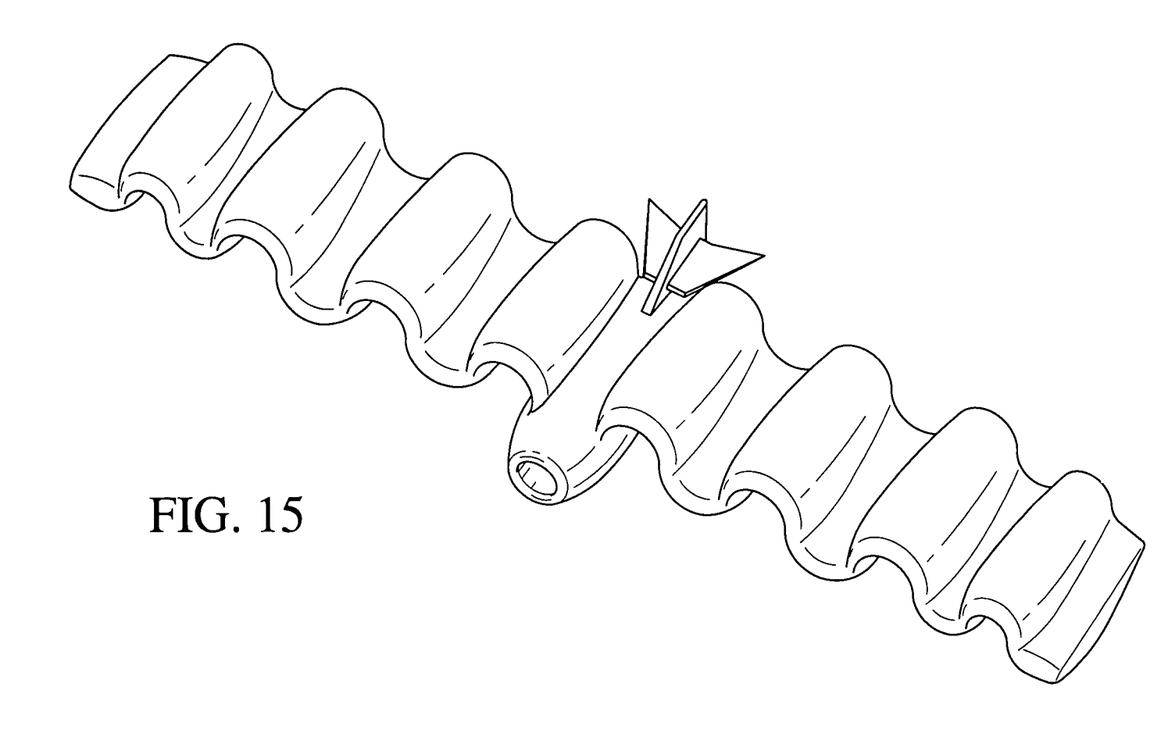
FIG. 15 shows an airplane with wavy airfoil wings.

FIG. 12 shows a portion of a wavy airfoil such that the synchronized wave form on the top and bottom surfaces could be better viewed. FIG. 13 is an example of the use of wavy airfoils in a vertical axis wind turbine (VAWT). Each wavy airfoil (17) is connected via a rod (18) to a central rotating rod (19) that powers a generator as it spins. This is but one example of the myriad ways that wavy airfoils could be utilized for generating wind power. FIG. 14 shows another type of VAWT. The wavy airfoil blades (20) are connected by a spoked hub (21) to a central rotating shaft (22) that powers a generator. For this VAWT, the waveforms are set to an angle of attack of less than 90 degrees. The increased lift over drag ratio and decreased noise are also valuable properties of wavy airfoils that could be utilized for aircraft wings. FIG. 15 is a conceptual airplane utilizing wavy airfoils as wings.

The invention claimed is:

1. An airfoil comprising a leading edge, a trailing edge and upper and lower surfaces wherein said airfoil has a lateral wave-like shape forming a surface waveform comprised of a plurality of alternating peaks and troughs such that the airfoil surfaces are synchronized such that the upper surface peak, or convexity is directly over the lower surface trough, or concavity and the peaks and troughs extends substantially for the entire chord length of the airfoil from the leading edge to the trailing edge and said alternating peaks and troughs are integral to the waveform cross-section and not additions and subtractions to a flat airfoil.

2. The airfoil of claim 1 wherein said surface waveform is of a constant wavelength from one edge of the airfoil to the other.

3. The airfoil of claim 1 wherein said surface waveform is of a constant amplitude from one edge of the airfoil to the other.

4. The airfoil of claim 1 wherein said surface waveform is variable in either wavelength and/or amplitude from one edge of the airfoil to the other.

5. The airfoil of claim 1 wherein said airfoil provides means of increasing the lift over drag ratio and delaying boundary layer separation of an air stream over said airfoil delaying stall.

6. The airfoil of claim 1 wherein said airfoil is utilized as blades in a vertical axis wind turbine (VAWT) system.

7. The airfoil of claim 1 wherein said airfoil is utilized as blades in a horizontal axis wind (HAWT) turbine system.

8. The airfoil of claim 1 wherein said airfoil is utilized as wings for a fixed or rotary winged aircraft.

9. The airfoil of claim 1 wherein said airfoil is utilized as a propeller blade.

10. The airfoil of claim 6 wherein said VAWT airfoil blades have the waveforms at an angle of attack with respect to the wind of from 0 to 45 degrees.

11. The airfoil of claim 7 wherein said HAWT airfoil blades have the waveforms at an angle of attack with respect to the wind of from 0 to 45 degrees.

12. A method of delaying the boundary layer separation of airflow over an airfoil; said airfoil having a wave shape such that the upper and lower surfaces are aligned such that the convexity of one surface is aligned with the concavity of the other surface and said wave shape extends from the leading edge to the trailing edge and runs the entire chord length;
    wherein said concavities and convexities are integral with the airfoil cross-section and are not additions to a flat airfoil.

13. The method of claim 12 wherein said wave shaped surfaces reduce the propagation of stall along said airfoil surface.

14. The method of claim 12 wherein said wave shaped surfaces cause the air to be forced into troughs and away from peaks of the waveform resulting in a pressure differential between the trough on one surface and the peak on the other surface of the airfoil.

15. The method of claim 14 wherein said increased air pressure through the troughs on the upper and lower wavy surfaces of said airfoil cross at a distance slightly behind the trailing edge.

* * * * *